UNITED STATES PATENT OFFICE.

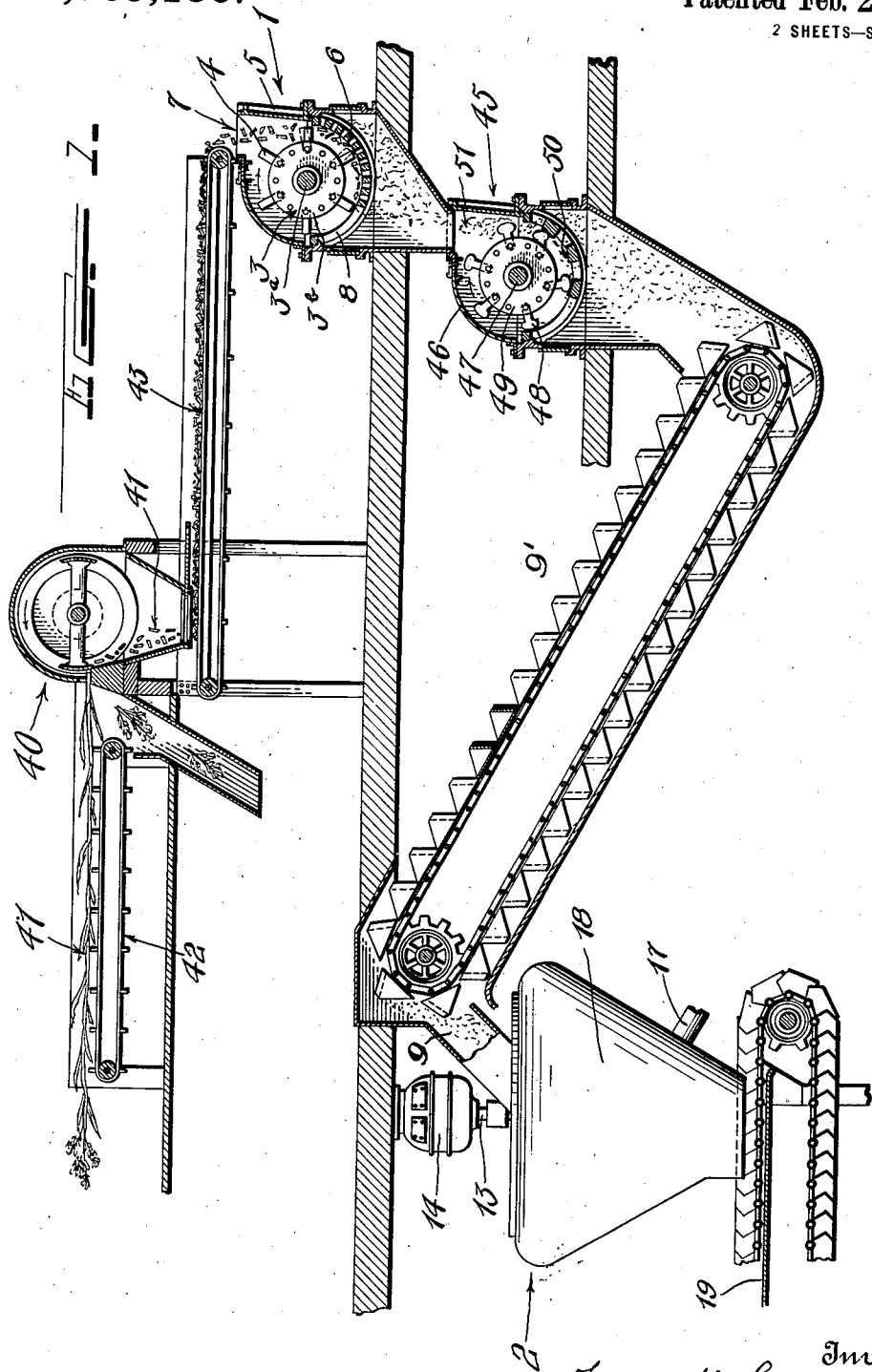

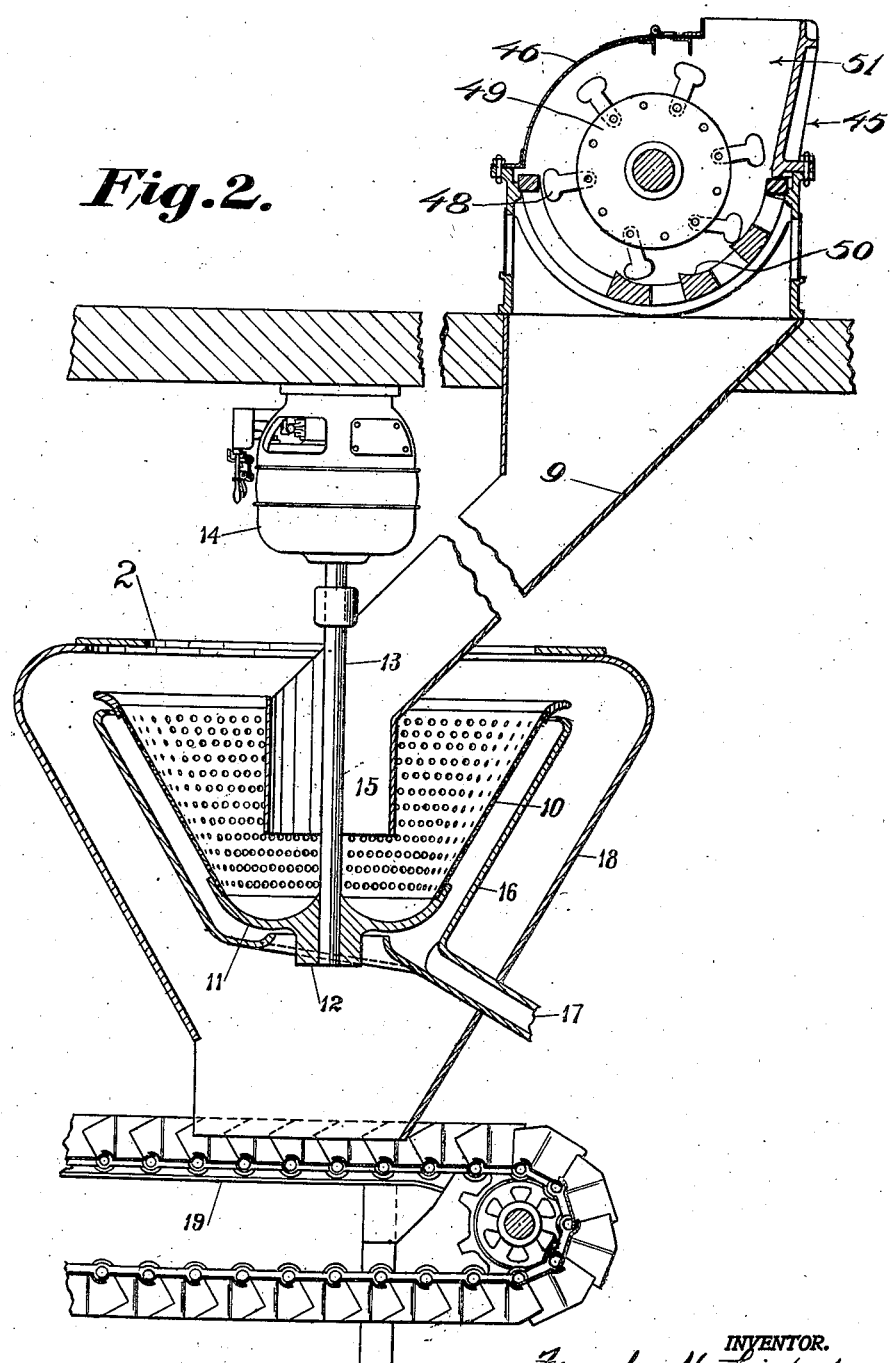

FRANK H. LINDENBERG, OF COLUMBUS, OHIO, ASSIGNOR TO THE JEFFREY MANUFACTURING COMPANY, OF COLUMBUS, OHIO, A CORPORATION OF OHIO.

TREATMENT OF SUGAR-CANE AND SIMILAR MATERIALS.

1,369,180. Specification of Letters Patent. Patented Feb. 22, 1921.

Application filed January 13, 1916. Serial No. 71,907.

*To all whom it may concern:*

Be it known that I, FRANK H. LINDENBERG, a citizen of the United States, residing at Columbus, in the county of Franklin and State of Ohio, have invented certain new and useful Improvements in Treatment of Sugar-Cane and Similar Materials, of which the following is a specification, reference being had therein to the accompanying drawing.

The present invention relates to a process for first reducing the solid parts of sugar cane to such condition that the said solid parts can be thoroughly separated from the liquor, and, second, for effecting such perfect separation.

Heretofore the general practice has been to pass the sugar cane stalks longitudinally between the rollers arranged in pairs, these being sometimes corrugated, sometimes smooth-surfaced; and sometimes a single mechanism having pairs of rolls of both sorts, those of one following those of the other.

The object has been to powerfully squeeze the stalks with the expectation of breaking down the cellular structure by the squeezing action or the collapsing of the stalk body, as an entirety, and causing the juices to be thus released or forced out.

In sugar cane, and similar vegetable growths, charged with native saccharine juices, the latter are contained in cylindrical cells arranged longitudinally of the stalk, the walls of which are protected by tough, wiry, woody fiber. These liquor-containing cells are formed in the smallest shreds or fibers of the stalks.

By the earlier process, as generally practised, above referred to, the squeezing rolls are expected to break down the fibrous bodies and the larger part of the cellular structure, they subjecting the cane, as it passes longitudinally between the rolls of a pair, to the compressing, crushing or squeezing action, and this is repeated many times in the attempt to insure the forcing out of all the juices.

When the rolling process is completed there is produced a mass of comparatively thin, but relatively strong, fibers which are intimately interwoven with each other, and which, as is well known, still contain a large percentage of unbroken cells, and these fibers with liquor-charged cells, still closed, pass on through the mechanism; and even though subjected to repeated steps of washing, or equivalent treatment, supplemental to the repeated squeezing, the liquid in them is discharged with the finally separated bagasse.

Even if this roller squeezing action could be applied uniformly from one end of the apparatus to the other, it would be practically impossible to effect the recovery of the entire liquor content.

But it is impossible to secure a uniform action because of the difficulty, in practice, of maintaining a uniform thickness of the stream of cane which is passed through the rolls, this difficulty being increased by the resistance of the free discharge of the juices from the cane, and by the reëxpansion of the fibers on the discharge side, accompanied by a suction which results therefrom, acting to carry a considerable portion of the juice on through the rolls. The repeated rollings and washings which have been utilized in attempting to obtain a complete separation add very materially to the cost of the apparatus and to the expense incident to the operation.

It has been proposed to obviate the difficulties incident to this roller process by the use of one or another of several other plans. These include the cutting of the cane or of the fibers into short lengths, and then subjecting these sections of short fibers to treatment for expressing the juices; and also include the proposal to first, subject the cane to the ordinary primary roller squeezing action, then shred the cane into masses of small pieces of fiber, and then continue with a series of squeezings and washings.

But, so far as I am aware, no one has designed a mechanism or process for the immediate release of the last particles of the liquor from the cells; either the cells in the bagasse product, comprising masses of relatively long fibers resulting from the ordinary roller or squeezing process, or the cells in the relatively short shreds or fiber particles obtained in the other method, referred to, of reducing the cane.

One of the objects of the present invention is to subject the cane at once to a treatment whereby it will be completely reduced to the form of a pulp with particles so fine in constitution that the solid matter will lose its fibrous character, and the ultimate cells will be broken open and their liquor released, or in other words, which will first change the cane from its natural state of a fibrous structure containing juice to a body of juice containing a pulp produced from the fiber, which is afterward separated from the juice by mechanical means.

My process can be carried on by using either of several mechanisms, provided the fibers shall not only be separated, as fibers, from each other, to the fullest extent possible, and provided that all of the fibers shall be so reduced that there shall no longer be possibility for them to retain the saccharine matter either within any native cells or by absorption.

In the drawings I have, typically, and more or less conventionally, illustrated an apparatus by which the sugar cane can be treated in accordance with my invention; although it is to be understood that I do not intend to limit myself to the details of the particular structure here shown.

Referring to the drawings:

Figure 1 is a view, partly in side elevation, partly in section, showing an apparatus which can be used in practising my invention.

Fig. 2 is a view, partly in elevation, partly in section, of a modified form of the apparatus.

The cane, while the stalks are still of their natural length can be delivered directly to the mechanism which is to comminute the fiber, the stalks being delivered thereto lengthwise.

But for many purposes I prefer to shorten the fibers by cutting the natural cane into short sections before the comminuting treatment is commenced. To thus sever the stalks into short sections any suitable mechanism can be used.

In Fig. 1, at 40 there is conventionally indicated a cutting apparatus which may be of any suitable size and capacity. 42 indicates a feeding means for delivering the natural cane 41 to this part of the apparatus. 43 is a takeaway mechanism which receives the severed sections of cane and carries them to the disintegrator.

The latter is indicated as an entirety by 1, and comprises a casing 5 within which there is a disintegrator having the rotary element 3. The latter comprises a rapidly revolving shaft 3ª with disks 3ᵇ carried thereby and pulverizing arms 4 pivoted to the disks.

Grate bars 6 are arranged in a concave series in close proximity to the paths of rotation of the ends of the disintegrating bars and coöperate therewith in reducing the solid part of the cane to fine shreds.

The stalks or sections of cane are fed into the disintegrating apparatus through the hopper or chute 7 and they are immediately struck by the rapidly whirling bars 4. The shaft and the disintegrator structure carried thereby revolve with high speed, twelve hundred revolutions a minute or more; and if, as shown, it is provided with six series of disintegrator arms there are, approximately, seven thousand two hundred strokes of these per minute along any one transverse line parallel to the axis, or one hundred and twenty per second. This exceedingly rapid imparting quickly disintegrates the sugar cane (whether fed longitudinally as long stalks, or fed in the form of short severed sections) into a mass of fine shreds or threads, and breaks open nearly all of the liquor-containing cells. These shreds of reduced bits of fiber, as they are being rapidly struck by the arms, many times a second and are being thereby advanced around the axis, are dragged rapidly across the upper edges of the grate bars 6, and to prevent their clogging the machine, and permit them to rapidly escape, there is an opening of extensive area at 8 on the rear side of the grate through which the shred mass can quickly drop.

The sub-dividing or comminuting of the cane stalks is, by the action of this mechanism, carried to a point much beyond that which is reached by the use of the initial squeezing rollers employed in the earlier processes.

But the tough wiry fibers of the sugar cane, even though reduced, to the extent described, by the cutting and disintegrating arms, still contain a percentage of cells more or less charged with liquor, some being the native liquor originally formed in the cells, and some being that which has been absorbed by the elastic fiber on expanding. This percentage of the liquor has been heretofore carried off with the waste bagasse as is well known much remaining in the solid material after the repeated squeezings and washings.

In order to carry the reduction of the solid material still further I transform the minute fibers into pulp. I employ a mechanism not for pressing or squeezing but for pounding or imparting blows to the minute fibers. Such a mechanism is indicated at 45. In some respects it resembles the disintegrating mechanism at 1, but in others is materially different. It has a casing 46 and a rapidly rotating element comprising a shaft 47 with disks 49 secured to the shaft. But the arms 48 are arranged and adapted to impart blows or pounding actions. Each of these arms is rounded and wide surfaced. Then, to coact with them one or more concave surfaces, as at 50, are arranged within the casing and as closely as possible to the circles of rotation of the outer ends of these arms. The anvil-like surfaces are arranged in the path of the descending fiber shreds that are brought down by the chute 51 from the disintegrator. As these shreds reach the concave table 50 they are struck by the rounded heads or ends of the pounding arms 48, and these exert a powerful flattening action upon the small fibers and act to crush open the last of the cells that may still remain intact after the preceding treatment. The parts can be so constructed and related that the walls of the cells in the fibers are reduced to a pulp by this action.

This treatment is materially different from the squeezing or pressing action that occurs when the cane is passed between the ordinary rolls used in following the older method. The heads of the pounding bars impinge on the fibers with powerful inertia and simultaneously drag and advance them over the stationary concave table or tables breaking down and tearing apart the threads of even the exceedingly minute fibers and open up the smallest cells. By the time the solid material reaches the lower edge of the concave table or the edge of the last table in the series the cane and its contents have, by the opening blows, been reduced to a mass of liquid in which is suspended the practically impalpable pulp.

So complete is the reduction of the cane to a pulpy condition that the mass is ready for immediate separation of the liquor from the solid contents. The repeated pressings, squeezings, and washings that are required in the ordinary treatment of sugar cane (because of the persistent tendency of the broken up bagasse to absorb the liquor and retain it with a sponge like action) are here dispensed with, as the solid constituent loses its absorbing power when treated in the way above described.

The separation of the solid from the liquid part I effect in a continuous operation by the mechanism indicated as an entirety at 2. This, to some extent, resembles a centrifugal separator, it having the perforated rapidly rotating receptacle 10, terminating in a hub 12, flanged at 11 at the lower end, and carried by the shaft 13, driven by, and suspended from, the motor 14, from which it receives power. The chute 9 to which the material is taken either directly, as in Fig. 2, or by means of an endless carrier 9', as in Fig. 1, from the reducing apparatus above terminates in a downwardly turned vertical tube 15, around a shaft 13. The liquid and the cane pulp descending from the reducing mechanism pass into the rotary perforated cone 10, and are immediately thrown into rapid rotation. The centrifugal force throws the liquor outward through the perforations, and it is caught by an outside conical vessel 16 wherein it is collected and from which it escapes through the duct 17.

The solid material, of the nature of pulp, produced from the fiber, although exceedingly fine, is too coarse to pass through the perforations of the separator, and it travels upward until it finally escapes at the top, then moves outward over the surface of the lip at the top of the separating cone, and is finally discharged and caught by the exterior wall 18 of the casing which converges to a conveyer 19 to which the dried material is delivered.

I believe myself to be the first to have subjected the sugar cane to steps of treatment such as I have described. As above indicated, I am aware of the fact that it has been passed through a long series of pairs of rolls and subjected at points intermediate of one pair of rolls and the next to water applied to it in one way or another. I am also aware of the fact that it has been proposed to insert in a mechanism, containing a long series of these rolls, a disintegrating apparatus more or less similar to that shown at 1 and above described. But so far as I know, no one has immediately subjected the cane to disintegrating action (whereby all the solid mass is quickly turned into minute shreds) and immediately thereafter continued the reduction by a pounding action which macerates the shreds, and forms a homogeneous pulp thereof. Again, I believe myself to be the first to have effected the rapid separation of the solid contents of the pulp mass from the liquid body by subjecting them to centrifugal action.

What I claim is:

1. The process for extracting all of the juices from sugar cane consisting in the complete comminution of the cane to form a homogeneous pulp and afterward separating the fibrous matter out of the fluid.

2. The process for extracting all of the juices from sugar cane consisting in the complete comminution of the cane to form a homogeneous pulp and afterward straining the fluid from the fibrous residue by mechanical means.

3. The herein described process for extracting all of the juices from sugar cane, it consisting in subjecting the original native cane stalks to a disintegrating and reducing action whereby the major part of the native liquor is released from the cells, and relatively fine shreds of stalk fiber are formed, then continuing the comminuting of the stalk fiber until all of the liquor-containing cells are broken and the minutely reduced particles of stalk with the liquor become a substantially homogeneous pulp, and then straining the saccharine fluid component from the comminuted fibers of the said cane pulp.

In testimony, whereof, I affix my signature, in presence of two witnesses.

FRANK H. LINDENBERG.

Witnesses:
DUDLEY T. FISHER,
HARRY C. DEAN.